J. F. HERMAN.
ANTISKIDDING CHAIN FOR WHEELS.
APPLICATION FILED APR. 12, 1916.

1,383,628. Patented July 5, 1921.

Witnesses
N. Abramson
E. S. Clements

Inventor
Joseph F. Herman

By
H. H. Byrne
Attorney

UNITED STATES PATENT OFFICE.

JOSEPH F. HERMAN, OF WASHINGTON, DISTRICT OF COLUMBIA, ASSIGNOR TO BERNADETTE M. HERMAN, OF WASHINGTON, DISTRICT OF COLUMBIA.

ANTISKIDDING CHAIN FOR WHEELS.

1,383,628. Specification of Letters Patent. Patented July 5, 1921.

Application filed April 12, 1916. Serial No. 90,578.

*To all whom it may concern:*

Be it known that I, JOSEPH F. HERMAN, a citizen of the United States of America, residing at Washington, in the District of Columbia, have invented certain new and useful Improvements in Antiskidding Chains for Wheels, of which the following is a specification.

The present invention relates to anti-skidding chains for wheels of automobiles and trucks and consists in the combinations and arrangements of parts hereinafter described and particularly set forth in the accompanying claims.

The invention has for its purpose to provide an anti-skidding chain of single length which is arranged and carried by the wheel in a manner providing a double chain length for active use on the tire tread, thereby obtaining the maximum efficiency or working area from the single chain on the wheel.

The invention has for its further purpose to provide a double working chain at the tread of the tire which will have positive engagement with the surface passed over, but which is so attached to the wheel that the respective chain lengths are allowed to creep transversely of the tire, thereby subjecting the contacting surfaces of the tire tread and chain to uniform wearing throughout.

The invention further contemplates the employment of adjusting means for readily attaching the device to the tire of any automobile wheel or truck, and which may be quickly removed and conveniently stored for carrying.

The types of anti-skidding chains disclosed herein are designed particularly with reference to dual tire wheels and to single tire wheels for trucks. And said chains are attached to the spokes of the wheel by means of chains and not with straps, which are the securing means disclosed in my U. S. Patent No. 1,315,366, dated Sept. 9, 1919.

The anti-skidding chains are shown by way of illustration in the accompanying drawings, wherein—

Figure 1:
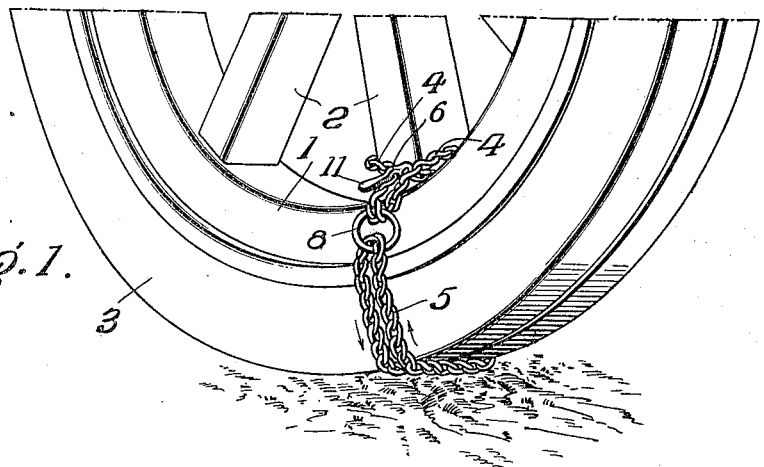

Figure 1 shows the application of the invention to a dual tire truck wheel.

Figure 2:
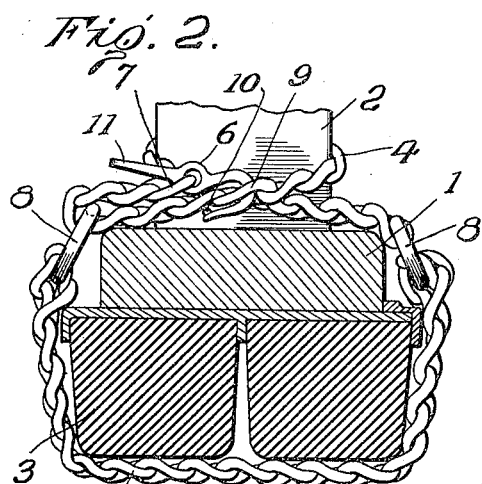
Figure 3:
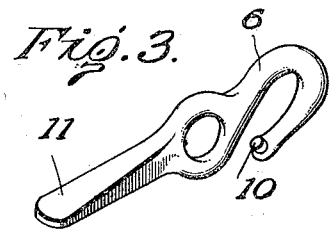
Figure 5:
Figure 4:
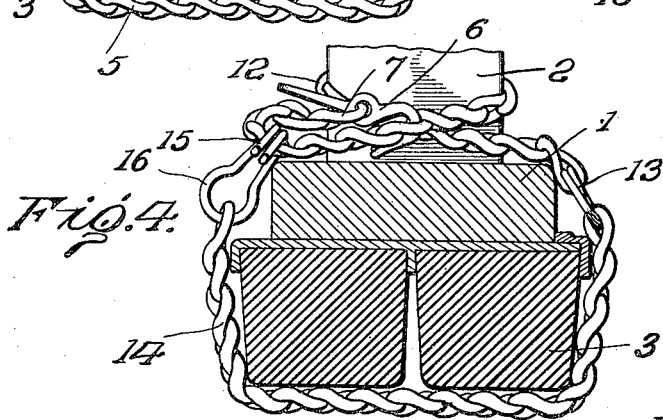
Figure 6:
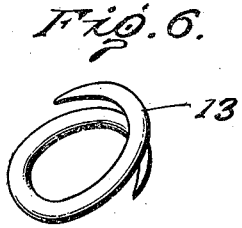

Fig. 2 is a transverse sectional view thereof showing the manner of applying and securing the chain, Fig. 3 is a detail view of the fastening hook employed, Fig. 4 is a modification showing the antiskidding chain of one length for dual tire truck wheels, Fig. 5 is a detail perspective view of the hook securing one end of the chain shown in Fig. 4, and Fig. 6 is a detail perspective view of the split ring securing the other end of said chain.

Referring to the construction in detail and with like characters designating corresponding parts in the different views shown, 1 designates the rim, 2 the spokes, and 3 the dual tires of any auto truck wheel.

The anti-skidding device comprises a chain 4 of single length that is wrapped around a spoke 2 (see Fig. 2) to position the anti-skidding chain 5 with respect to the circumference of the wheel. Said chain 4 carries at one end a hook 6 that is loosely connected to the end link 7 and adapted to engage with any other link in said chain 4 after having been wrapped around the spoke 2 and thence passed through the rings 8 carrying the tread chain 5. The connection between the chain 4 and the rings 8 is clearly shown in Fig. 2, and in this position the hook 6 engages with any link 9 in the chain 4 when said chain and the anti-skidding chain have been brought to the proper tightness. In this respect the attaching chain 4 is adjustable in that it may be fitted to spokes of various sizes and secured with the required tightness when fitted to the wheel.

A lug or spur 10 is formed on the end of the hook member 6 and serves to prevent disengagement between said hook and its attached link through the ordinary shaking or vibration due to the running of the vehicle; and said hook is also formed with a shank extension 11 that acts after the manner of a counter-balancing element to hold the hook 6 from disengaging with its connected link. Said shank portion 11 bears against the adjacent links of the chain, as shown in Fig. 2, and, together with the lug 10, effectively holds the link in secured position. The shank 11 is furthermore used as a hand-gripping piece for applying the chain length 4 to the spoke of the wheel.

The anti-skidding chain 5 is constructed endless and arranged, through the rings 8, to form a double length at the periphery of the tire, as shown in Figs. 1 and 2; and since the securing chain 4 is fastened to a spoke of the wheel, the anti-skidding chain is prevented from bodily traveling circumferentially of the wheel.

It has been found from actual use over a considerable period of time, that the chain 5 travels or "creeps" through the rings 8 precisely after the manner of a belt riding on pulleys (as shown by the arrows in Fig. 1), and by reason of this movement, the chain and that portion of the tire in contact therewith are subjected to uniform wearing throughout their respective engaging surfaces. The tire is therefore not liable to become injured through continual contact with a multilated chain link which would otherwise be the case were the chain not free to move continuously in a direction transversely of the tire. There is also the further advantage that with having the double chain lengths in engagement with the ground, an increased gripping action is obtained for the wheel over that derived with the usually employed single chain.

In the arrangement shown in Fig. 4, the spoke attaching chain 12 is wrapped once around the spoke 2, as in Fig. 1, and has its respective ends provided with a hook 6 and a split ring 13. The anti-skidding or tread chain 14 is of single length only and is connected to the spoke attaching chain by engaging therewith through the means of said split ring 13 and the double hook 15, the latter member being constructed with the hook or eye 16 through which the spoke chain 12 passes.

It is obvious that those skilled in the art may vary the details of construction and arrangement of parts without departing from the spirit of the invention, and therefore I do not wish to be limited to such features except as may be required by the claims.

Having thus fully described my said invention, what I claim as new and desire to secure by Letters Patent, is:

1. An anti-skidding device for wheels comprising a flexible member adapted to be applied to a spoke of the wheel, a hook connected to one end of said flexible member and adapted to adjustably engage with the flexible member intermediate the ends thereof to provide a loop portion and secure the device to the wheel spoke, and a chain secured to said loop portion and the free end of the flexible memebr and disposed transversely of the tire tread, substantially as set forth.

2. An anti-skidding device for wheels comprising a flexible member adapted to be applied to a spoke of the wheel by wrapping thereon, a hook connected to one end of said flexible member, a ring connected to the other end of the flexible member, said hook adapted to engage with the flexible member intermediate the ends thereof to provide a loop portion and secure the device to the wheel spoke, and a chain secured to said ring and the loop portion and disposed transversely of the tire tread, substantially as set forth.

3. A hook for securing anti-skid chains constructed with a spur and shank extension adapted to engage with the chain and prevent displacement of the hook, and a chain secured to said loop portion and the free end of the chain and disposed transversely of the tire tread, substantially as set forth.

4. An anti-skidding device for wheels comprising a chain, a ring secured to a link at one end of said chain, a hook connected to the link at the other end of the chain, said chain adapted to be applied to a spoke of the wheel by wrapping thereon and said hook adapted to adjustably engage with the links in the chain to secure the same and to provide a chain loop, and a chain secured to said chain ring and the chain loop and disposed transversely of the tire tread, substantially as set forth.

In testimony whereof I affix my signature in the presence of a witness.

JOSEPH F. HERMAN.

Witness:
E. C. CLEMENTS.